United States Patent
Hikmet et al.

(10) Patent No.: US 9,897,285 B2
(45) Date of Patent: Feb. 20, 2018

(54) WAVELENGTH CONVERTING ELEMENT

(75) Inventors: Rifat Ata Mustafa Hikmet, Eindhoven (NL); Johan Lub, Valkenswaard (NL); Rene Theodorus Wegh, Veldhoven (NL); Paulus Alberts Van Hal, Waalre (NL); Jan Cornelis Kriege, Mierlo (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/131,932

(22) PCT Filed: Jul. 2, 2012

(86) PCT No.: PCT/IB2012/053344
§ 371 (c)(1),
(2), (4) Date: Jan. 10, 2014

(87) PCT Pub. No.: WO2013/008125
PCT Pub. Date: Jan. 17, 2013

(65) Prior Publication Data
US 2014/0125222 A1    May 8, 2014

Related U.S. Application Data

(60) Provisional application No. 61/507,148, filed on Jul. 13, 2011.

(30) Foreign Application Priority Data

Jul. 13, 2011 (EP) .................................. 11173794

(51) Int. Cl.
*H01L 33/50* (2010.01)
*F21V 9/16* (2006.01)
(Continued)

(52) U.S. Cl.
CPC ................ *F21V 9/16* (2013.01); *C09K 11/06* (2013.01); *H05B 33/20* (2013.01); *C09K 2211/1011* (2013.01)

(58) Field of Classification Search
CPC ..... H01L 33/50–33/508; C09K 11/02–11/025; F21K 9/64
(Continued)

(56) References Cited

U.S. PATENT DOCUMENTS 7,099,091 B2 * 8/2006 Taniguchi et al. ............ 359/722
2004/0169936 A1    9/2004 Taniguchi
(Continued)

FOREIGN PATENT DOCUMENTS

JP    2000230172 A    8/2000
JP    2007262375 A    10/2007
(Continued)

OTHER PUBLICATIONS

Rharbi et al., "A Method for Measuring Oxygen Diffusion and Oxygen Permeation in Polymer Films Based on Fluorescence Quenching", Department of Chemistry, University of Toronto, Analytical Chemistry, vol. 71, No. 22, pp. 5045-5053, Nov. 15, 1999.

*Primary Examiner* — Mariceli Santiago

(57) ABSTRACT

A wavelength converting element (101, 102, 103, 110) comprising a polymeric carrier material comprising a first wavelength converting material adapted to convert light of a first wavelength to light of a second wavelength, wherein the oxygen diffusion coefficient (D) of the polymeric carrier material is $8 \times 10^{-13}$ cm$^2$/s or less at 25° C. A prolonged lifetime of the wavelength converting material is achieved by selecting a polymeric carrier material with an oxygen diffusion coefficient (D) at $8 \times 10^{-13}$ cm$^2$/s or less at 25° C.

20 Claims, 4 Drawing Sheets

(51) Int. Cl.
*C09K 11/06* (2006.01)
*H05B 33/20* (2006.01)

(58) Field of Classification Search
USPC .................................................. 313/498–512
See application file for complete search history.

(56) References Cited

U.S. PATENT DOCUMENTS

| | | |
|---|---|---|
| 2005/0022865 A1 | 2/2005 | Robeson |
| 2005/0200796 A1* | 9/2005 | Iwanaga et al. ............... 349/149 |
| 2005/0230691 A1* | 10/2005 | Amiotti .................... H01L 33/56 257/79 |
| 2005/0261400 A1* | 11/2005 | Yang et al. ............... 252/301.16 |
| 2007/0228932 A1* | 10/2007 | Amano et al. ................. 313/502 |
| 2007/0273274 A1 | 11/2007 | Horiuchi |
| 2009/0021148 A1* | 1/2009 | Hachiya et al. ............... 313/504 |
| 2010/0052504 A1* | 3/2010 | Sato ........................ C09K 11/02 313/483 |
| 2011/0135958 A1* | 6/2011 | Okada et al. ................. 428/704 |
| 2012/0228564 A1 | 9/2012 | Hashimoto et al. |
| 2012/0301724 A1* | 11/2012 | Frauenrath et al. ........ 428/411.1 |

FOREIGN PATENT DOCUMENTS

| | | |
|---|---|---|
| JP | 2007273498 A | 10/2007 |
| JP | 2011041938 A | 3/2011 |
| WO | 2012042438 A1 | 4/2012 |
| WO | 2012085780 A1 | 6/2012 |

\* cited by examiner

WAVELENGTH CONVERTING ELEMENT

CROSS-REFERENCE TO PRIOR APPLICATIONS

This application is a U.S. national stage application under 35 U.S.C. § 371 of international Application No. PCT/IB2012/053344 filed on Jul. 2, 2012, which claims the priority benefit under 35 U.S.C. § 119(e) of U.S. Provisional Application No. 61/507,148 filed on Jul. 13, 2011 and of European Patent Application No. 11173794.6, filed on Jul. 13, 2011, the contents of which are herein incorporated by reference.

FIELD OF THE INVENTION

The present invention relates to a wavelength converting element comprising a polymeric carrier material comprising a phosphor and a light-emitting device comprising such a light converting element.

BACKGROUND OF THE INVENTION

Light-emitting diode (LED) based illumination devices are increasingly used for a wide variety of lighting applications. LEDs offer advantages over traditional light sources, such as incandescent and fluorescent lamps, including long lifetime, high lumen efficacy, low operating voltage and fast modulation of lumen output.

Efficient high-power LEDs are often based on blue light emitting materials. To produce an LED based illumination device having a desired color (e.g., white) output, a suitable wavelength converting material, commonly known as a phosphor, may be used which converts part of the light emitted by the LED into light of longer wavelengths so as to produce a combination of light having desired spectral characteristics. The wavelength converting material may be applied directly on the LED die, or it may be arranged at a certain distance from the phosphor (so-called remote configuration).

Many inorganic materials have been used as phosphor materials for converting blue light emitted by the LED into light of longer wavelengths. However, inorganic phosphors suffer from the disadvantages that they are relatively expensive. Furthermore, inorganic phosphors are light scattering particles, thus always reflecting a part of the incoming light, which leads to loss of efficiency in a device. Furthermore, inorganic LED phosphors have limited quantum efficiency and a relatively broad emission spectrum, in particular for the red emitting LED phosphors, which leads to additional efficiency losses.

Currently, organic phosphor materials are being considered for replacing inorganic phosphor in LEDs where conversion of blue light to yellow/orange light is desirable, for example for achieving white light output. Organic phosphors have the advantage that their luminescence spectrum can be easily adjusted with respect to position and band width. Organic phosphor materials also often have a high degree of transparency, which is advantageous since the efficiency of the lighting system is improved compared to systems using more light-absorbing and/or reflecting phosphor materials. Furthermore, organic phosphors are much less costly than inorganic phosphors. However, since organic phosphors are sensitive to the heat generated during electroluminescence activity of the LED, organic phosphors are primarily used in remote configuration devices.

The main drawback hampering the application of organic phosphor materials in remote phosphor LED based lighting systems is their poor photo-chemical stability.

US2007/0273274 (Horiuchi et al.) discloses a translucent laminate sheet comprising a light-emitting device and comprising an organic phosphor arranged in an airproofed cavity having low concentration of oxygen such that the deterioration of the phosphor is reduced. However, keeping a low concentration of oxygen is difficult and costly.

Hence, there remains a need in the art for improved light-emitting devices employing organic phosphor materials.

SUMMARY OF THE INVENTION

In view of the above-mentioned and other drawbacks of the prior art, an object of the present invention is to provide wavelength converting element comprising a phosphor having increased lifetime.

According to a first aspect of the invention, this and other objects are achieved by a wavelength converting element comprising a polymeric carrier material comprising a first organic wavelength converting material adapted to convert light of a first wavelength to light of a second wavelength, wherein the oxygen diffusion coefficient (D) of the polymeric carrier material is $8 \times 10^{-13}$ cm$^2$/s or less at 25° C. The wavelength converting element is comprised in a light-emitting device further comprising a light source adapted to emit light of a first wavelength, wherein the wavelength converting element is arranged to receive light of the first wavelength and adapted to convert at least part of the light of the first wavelength to light of a second wavelength.

In embodiments of the invention the first wavelength converting material may be an organic phosphor material comprising a perylene derivate.

The stability of an organic phosphor material may be improved by incorporation thereof in polymeric materials, and this has recently been described further in the non-published application (EP 10181066.1), hereby incorporated by reference.

The inventors surprisingly found that the degradation rate of a wavelength converting material when contained in an inert atmosphere is essentially the same compared to the corresponding degradation rate in an atmosphere with an oxygen concentration of 0.6% or less, whereas for oxygen concentrations above 0.6% the degradation rate of a wavelength converting material increases rapidly with increasing oxygen concentration as is normally expected. Thus, the inventors have found that the same stability and thus life time of a wavelength converting material as achieved in an inert atmosphere can be achieved by providing an atmosphere having an oxygen concentration of 0.6% or less. Thereby, there is no need to provide a completely inert atmosphere.

By analogy with the above discussed discovery, the inventors have found that a wavelength converting material, such as an organic phosphor material, comprised in a polymeric carrier material exhibits excellent stability and thereby improved lifetime as long as the oxygen diffusion coefficient (D) of the polymeric carrier material is $8 \times 10^{-13}$ cm$^2$/s or less at 25° C. The inventors have shown that the degradation rate of the wavelength converting material increases rapidly with increasing oxygen diffusion coefficient (D) for polymeric carrier material having an oxygen diffusion coefficient (D) above $8 \times 10^{-13}$ cm$^2$/s, thus presumably corresponding to the upper oxygen concentration of 0.6% as discussed above.

Advantageously, the oxygen diffusion coefficient (D) of the polymeric carrier material may be $4\times10^{-13}$ cm$^2$/s or less at 25° C., such as, for example $1\times10^{-13}$ cm$^2$/s or less at 25° C.

In embodiments of the wavelength converting element according to the invention, the polymeric carrier material may advantageously comprise a semi-crystalline polymeric material.

Advantageously, the first wavelength converting material comprises an organic wavelength converting material.

In embodiments of the wavelength converting element according to the invention, the first wavelength converting material may comprise a perylene derivate.

In embodiments of the wavelength converting element according to the invention, the glass transition temperature of the polymeric carrier material may be 60° C. or above, for example 100° C. or above, such as 140° C. or above.

In embodiments of the wavelength converting element according to the invention, the polymeric carrier material is advantageously transparent to light of the first wavelength and the second wavelength.

In the wavelength converting element according to the invention, the polymeric carrier material comprises polyethylene terephthalate (PET) and/or a copolymer thereof and/or polyethylene naphthalate (PEN) and/or a copolymer thereof, or at least one of polyacrylonitril, polvinylidene chloride, cellulose, polyamides, and ethylenevinylalcohol.

In embodiments of the wavelength converting element according to the invention, the first wavelength converting material may be dispersed in the polymeric carrier material, wherein the content of the first wavelength converting material in the wavelength converting member may be 1% or less by weight.

In embodiments of the wavelength converting element according to the invention, the polymeric material may be in the form of a film having a thickness in the range of from 30 micrometer to 2 mm.

In embodiments of the wavelength converting element according to the invention, the wavelength converting element may comprise a second wavelength converting material adapted to convert light of a first wavelength to light of a third wavelength. Thus, using more than one wavelength converting material, the optical properties thereof can be more conveniently adapted as desired. The second wavelength converting material may be inorganic or organic.

In embodiments of light-emitting device according to the invention, the light source and the wavelength converting element may be arranged mutually spaced apart, that is in so-called remote configuration wherein the wavelength converting element is less exposed to the high operating temperature of a LED, thereby reducing the degradation rate of the phosphor material.

A method of manufacturing a polymeric material for use in a wavelength converting element comprises the step of identifying a polymeric carrier material having an oxygen diffusion coefficient (D) of $8\times10^{-13}$ cm$^2$/s or less at 25° C.

It is noted that the invention relates to all possible combinations of features recited in the claims.

BRIEF DESCRIPTION OF THE DRAWINGS

This and other aspects of the present invention will now be described in more detail, with reference to the appended drawings showing exemplary embodiment(s) of the invention, wherein.

DESCRIPTION OF EXAMPLE EMBODIMENTS OF THE INVENTION

In the following description, the present invention is described with reference to a wavelength converting element comprising a polymeric carrier material having a wavelength converting material dispersed or molecularly dissolved therein, and a light emitting device comprising such wavelength converting element.

The present inventors have surprisingly found that improved stability and thus prolonged lifetime of the wavelength converting material is achieved by selecting a polymeric carrier material with an oxygen diffusion coefficient (D) at $8\times10^{-13}$ cm$^2$/s or less at 25° C. The oxygen diffusion coefficient (D) of the polymeric carrier material may preferably be $4\times10^{-13}$ cm$^2$/s or less at 25° C., such as, for example $1\times10^{-13}$ cm$^2$/s or less at 25° C.

The polymeric carrier material may advantageously comprise a semi-crystalline polymer.

Furthermore, the polymeric carrier material may advantageously have a relatively high glass transition temperature, for example 60° C. or above, preferably 100° C. or above, such as 140° C. or above. This is because the oxygen diffusion coefficient of a polymer is typically relatively high at temperatures above its glass transition temperature. Thus a polymeric carrier material with a relatively high glass transition temperature maintains a low oxygen diffusion coefficient even at higher temperatures (e.g. the high operating temperature of a LED).

In the wavelength converting element according to the invention, the polymeric carrier material comprises polyethylene terephthalate (PET) and/or a copolymer thereof and/or polyethylene naphthalate (PEN) and/or a copolymer thereof, or at least one of polyacrylonitril, polyvinylidene chloride, cellulose, polyamides, and ethylenevinylalcohol.

FIGS. 1a-d show a cross-sectional side view of exemplary embodiments of a light-emitting device 104, 105, 106, 107 according to the invention comprising a plurality of LEDs 100, and at least one wavelength converting element 101, 102, 103, 110 arranged at a distance from the LEDs 100 in so-called remote configuration to receive light of a first wavelength emitted from the LEDs 100 and adapted to convert at least part of the light of the first wavelength to light of a second wavelength. The polymeric carrier material is typically light transmissive, such that light emitted by the LEDs and/or converted by the wavelength converting material comprised in the wavelength converting element 101, 102, 103, 110 may be transmitted through.

Figure 1A:
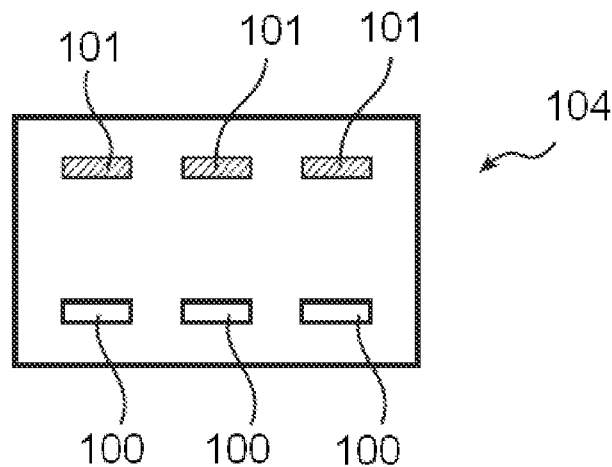
FIGS. 1a-d show a cross-sectional side view of embodiments of a light-emitting device according to the invention.
Figure 1B:
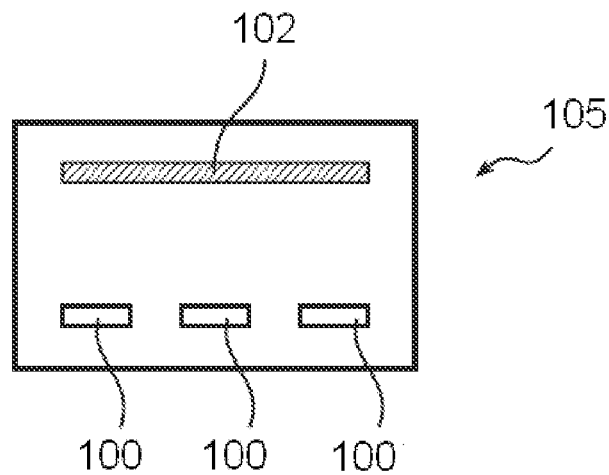
Figure 1C:
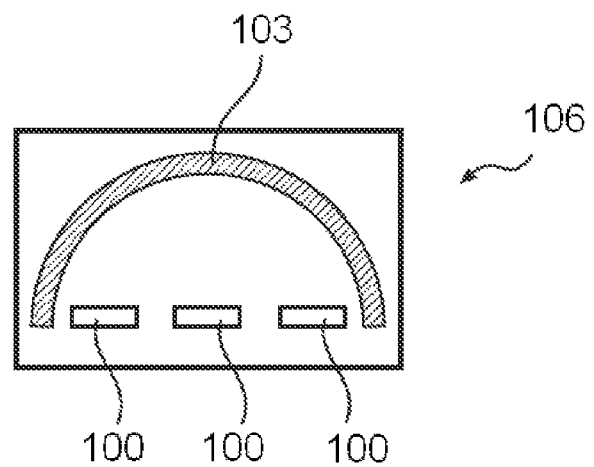
Figure 1D:
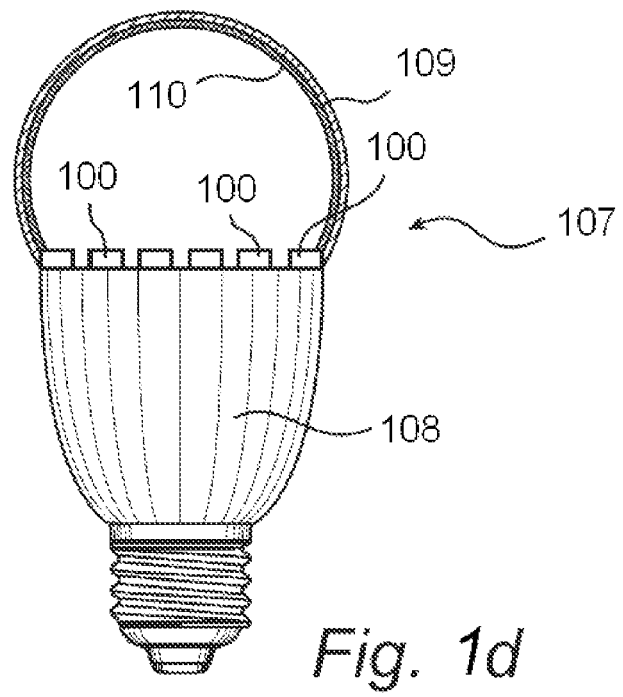

As shown in FIG. 1a, a light-emitting device 104 may comprise a plurality of wavelength converting elements 101, each one arranged to receive light from a single LED 100, or as shown in FIGS. 1b-d, a light-emitting device 105, 106, 107 comprising a single wavelength converting element 102, 103, 110 arranged to receive light from all of the LEDs 100. Further, as is illustrated in FIGS. 1c-d, the wavelength converting element 103, 110 may be shaped as a dome or bulb. The wavelength converting element may also be in the form of a film which can be curved and fitted into or wrapped around a glass tube, and such tube can be provided with light-emitting diodes to function as a retrofit fluorescent lamp. When the polymeric carrier material is in the form of a film having the wavelength converting material dispersed therein, the thickness of the film may be in the range of from 30 micrometer to 2 millimeter.

FIG. 1d shows an embodiment of the light-emitting device according to the invention which is here provided as a retrofit lamp 107 comprising a base part 108 provided with a traditional cap 108. The light converting element 110 in FIG. 1d is in a bulb shaped form in order to fit with the corresponding form of the light outlet member 109.

Furthermore, as would be understood by the skilled person, the present inventive method does not relate to the use of any specific organic phosphor compounds, and consequently, the wavelength converting material may comprise any organic phosphor compounds with desirable properties for a given application of the wavelength converting element. However, perylene derived compounds such as perylene bis and mono amides, for example, any one of dyes 'F170', 'F240', 'F083', 'F300' or 'F305', which are commercially available from BASF, may advantageously be used as these phosphor compounds show higher stability than others and good optical properties.

Further examples include difluoro-boraindacene derivatives (BODIPY) fluorescent dyes, fluorene derivatives, coumarin dyes, xanthene dyes, pyrromethane-BF2(P-BF2) complexes, stilbene derivatives, rhodamine dyes, luminescent polymers such as polyphenylene vinylene (PPV) polyphenyl derivatives, fluorescent metal complexes, among others.

In one embodiment of the present invention the first wavelength converting material may comprise nano phosphors such as so-called quantum dots, comprising, for example, cadmium selenide and indium phosphide.

In embodiments of the wavelength converting element according to the invention, the wavelength converting element may comprise a second wavelength converting material adapted to convert light of a first wavelength to light of a third wavelength. The second wavelength converting material may be an inorganic or an organic phosphor material. Thus, using more than one wavelength converting material, the spectral composition of the output light can be more conveniently adapted as desired.

Examples of inorganic phosphor materials may include, but are not limited to, Ce doped YAG ($Y_3Al_5O_{12}$) or LuAG ($Lu_3Al_5O_{12}$). Ce doped YAG emits yellowish light, and Ce doped LuAG emits yellow-greenish light. Examples of other inorganic phosphor materials which emit red light may include, but are not limited to ECAS (ECAS, which is $Ca_{1-x}AlSiN_3:Eu_x$; with $0<x\leq1$; especially $x\leq0.2$) and BSSN (BSSNE, which is $Ba_{2-x-z}M_xSi_{5-y}AlyN_{8-y}O_y:Eu_z$ (M=Sr, Ca; $0\leq x\leq1$, especially $x\leq0.2$; $0\leq y\leq4$, $0.0005\leq z\leq0.05$).

In the invention the light source is advantageously a solid state light source such as, for example, a LED or a laser, preferably emitting light in the blue violet or ultraviolet part of the light spectrum.

Additionally, variations to the disclosed embodiments can be understood and effected by the skilled person in practicing the claimed invention, from a study of the drawings, the disclosure, and the appended claims. For example, FIGS. 1a-d are only exemplary embodiments of light-emitting devices wherein the wavelength converting element of the invention may be used, it should be understood that the wavelength converting element can be adapted and used in virtually any type of light-emitting device wherein conversion of light from one wavelength to another is desired. Furthermore, the wavelength converting element may be applied as a coating on any light-emitting device. It is also contemplated that the wavelength converting member may be a self-supporting layer, such as a film or sheet standing free from a light-emitting device having any suitable shape.

The advantages of the method according to the present invention have been demonstrated in experiments.

EXAMPLE

Figure 2:
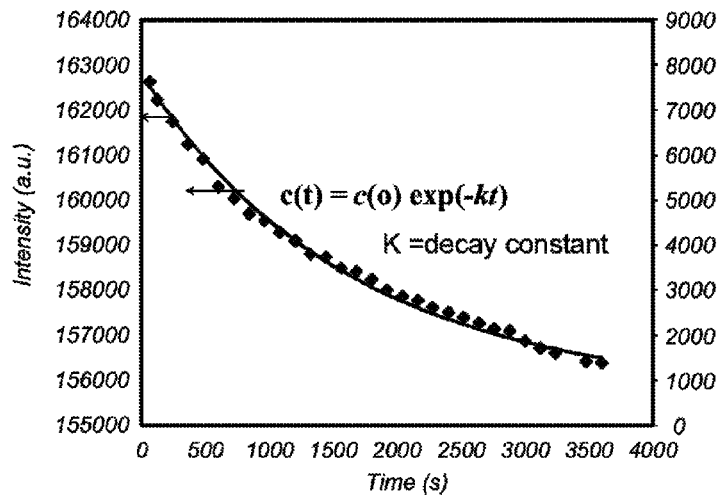
FIG. 2 shows a plot of the emission from a layer of a polymeric material comprising a phosphor material as a function of time.

In one experiment 0.1% Red F305 dye (which is a commercially available organic phosphor) in a polymethylmethacrylate (PMMA) matrix was used. FIG. 2 shows the emission from a 30 micron thick layer of the prepared PMMA matrix comprising the phosphor material illuminated with blue light of 450 nm at a light flux density of 4.2 W/cm$^2$ as a function of time. The initial absorption in the layer is 10% therefore the intensity is directly related to the dye concentration. As can be seen, the intensity drops irreversibly with time because of photo-chemical reaction, in an exponential function of time with a decay rate k.

Figure 3:
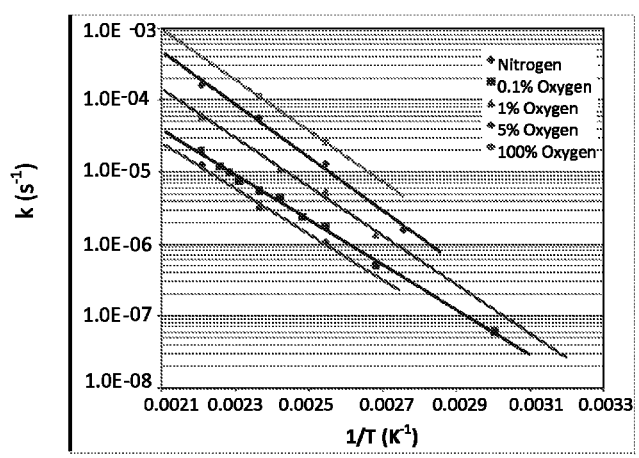
FIG. 3 shows a plot of the decay rate of a phosphor material comprised in a polymeric material at different oxygen concentrations as a function of the inverse temperature.

The prepared polymeric material containing the phosphor material was than illuminated with blue light of 450 nm at a light flux density of 4.2 W/cm$^2$ and the decay rate of the phosphor material was measured at various temperatures for various oxygen concentrations. In FIG. 3 the decay rate, which is a measure of the lifetime, is plotted as a function of the inverse temperature. As can be seen in FIG. 3, the parallel lines corresponding to a given oxygen concentration shift upwards towards higher rate of degradation with increasing oxygen concentration.

Figure 4:
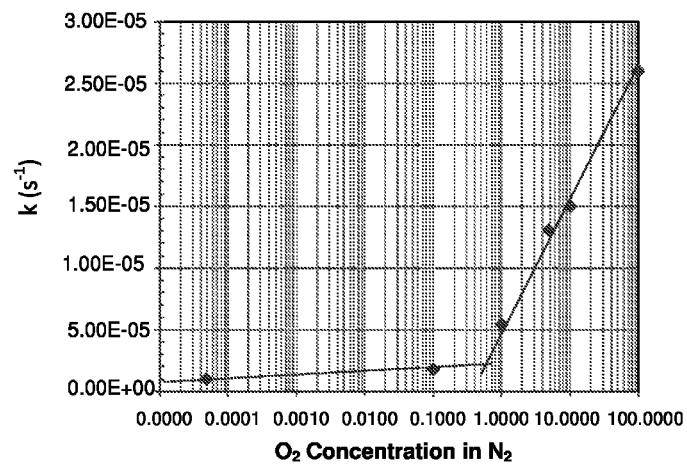
FIG. 4 shows a plot of the decay rate (measured at 120° C.) of a phosphor material comprised in a polymeric material as a function of the oxygen concentration (in N$_2$) on a logarithmic scale.

In FIG. 4 the degradation rate of the phosphor material measured at 120° C. is plotted as a function of oxygen concentration (in nitrogen) on a logarithmic scale. It can be seen the two different regimes can be identified. Up to the measured point of 0.1% oxygen, the concentration has only a slight effect on the degradation rate. Thus, the inventors could define two regimes by drawing straight lines as shown in FIG. 4. These lines cross at a concentration of 0.6% oxygen. The inventors define two regimes: up to about 0.6% oxygen, the degradation remains in the first regime and the oxygen concentration has only a slight influence on the degradation rate. At higher concentrations the degradation rate increases very rapidly with increasing oxygen concentration.

Figure 5:
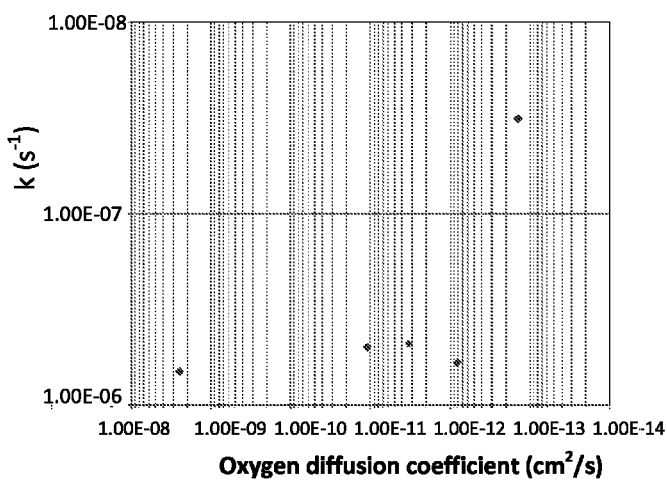
FIG. 5 shows a plot of the decay rate (measured at 60° C.) of a phosphor material comprised in different polymeric materials as a function of the oxygen diffusion constant (D) of the different polymeric materials.

In the same way the inventors used various polymers with different oxygen diffusion constants and measured the degradation rate of perylene Red F305 material contained therein at 60° C. The results are shown in Table 1 and plotted in FIG. 5 where the degradation rate of the phosphor material measured is plotted as a function of oxygen diffusion coefficient of the polymer. As shown in FIG. 5, the degradation rate of the phosphor is relatively constant for polymers with oxygen diffusion constants (D) above $8\times10^{-13}$ cm$^2$/s, whereas the degradation rate of the phosphor decreases significantly when D is around or below $8\times10^{-13}$ cm$^2$/s.

TABLE 1

| Polymer | Oxygen diffusion coefficient (cm$^2$/s) | degradation rate (s$^{-1}$) |
| --- | --- | --- |
| Polymethylmethacrylate | 8.09E−13 | 6.00E−07 |
| Polycarbonate | 3.30E−12 | 4.80E−07 |
| Polyethylene terephthalate | 1.40E−13 | 3.20E−08 |
| Silres silicone | 2.50E−09 | 6.70E−07 |
| Polystyrene | 1.10E−11 | 5.00E−07 |

In another experiment 0.01% of solvent yellow 98 (a non perylene derived compound) in a PMMA matrix was used and compared with a similar experiment in a PET matrix. The experimental conditions were same as above. As shown in table 2, a lower degradation rate in PET, which is a polymer with a relatively low oxygen diffusion coefficient (see table 2) compared to that in PMMA, which is a polymer with a relatively high oxygen diffusion coefficient (see table 2), is observed.

TABLE 2

| Polymer | Oxygen diffusion coefficient (cm$^2$/s) | degradation rate (s$^{-1}$) |
| --- | --- | --- |
| Polymethylmethacrylate | 8.09E−13 | 5E−05 |
| Polyethylene terephthalate | 1.40E−13 | 8E−07 |

The trends observed here were obtained using layers with a thickness range 0.03 to 2 mm which are used in various lighting devices. The experiments conducted were accelerated tests, with very high blue light density leading to reasonable experiment times. Under nominal lighting conditions, the blue light intensity is much lower leading to a much slower decay, such that lifetime requirements of LED lamps (usually 50000 h) can be met under certain conditions.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:

1. A light-emitting device comprising:
   a solid state light source adapted to emit light of a first wavelength, and
   a wavelength converting element, arranged to receive light of said first wavelength and adapted to convert at least part of the light of said first wavelength to light of a second wavelength, said wavelength converting element comprising a polymeric carrier material transparent to light of said first and second wavelengths, said polymeric carrier material comprising a first organic wavelength converting material adapted to convert light of a first wavelength to light of a second wavelength,
   wherein the oxygen diffusion coefficient (D) of said polymeric carrier material is $8\times10^{-13}$ cm$^2$/s or less at 25° C.,
   wherein said first organic wavelength converting material is embedded in said polymeric carrier material comprising a semi-crystalline polymeric material comprising polyethylene terephthalate (PET) and/or a copolymer thereof and/or polyethylene naphthalate (PEN) and/or a copolymer thereof, or at least one of polyacrylonitril, polyvinylidene chloride, cellulose, polyamides, and ethylenevinylalcohol,
   wherein said first organic wavelength converting material comprises one or more dyes consisting of: difluoroboraindacene derivatives (BODIPY); xanthene dyes, pyrromethane-BF2 complexes, stilbene derivatives, rhodamine dyes, and luminescent polymers including polyphenylene vinylene (PPV) and polyphenyl derivatives dye; and
   wherein said wavelength converting element is enclosed in a space and exposed to an atmosphere within the space having an oxygen concentration of 0.6% or less.

2. The light-emitting device according to claim 1, wherein the oxygen diffusion coefficient (D) of said polymeric carrier material is $4\times10^{-13}$ cm$^2$/s or less at 25° C.

3. The light-emitting device according to claim 1, wherein the oxygen diffusion coefficient (D) of said polymeric carrier material is $1\times10^{-13}$ cm$^2$/s or less at 25° C.

4. The light-emitting device according to claim 1, wherein said first organic wavelength converting material further comprises:
   a perylene derivate, including perylene bis and mono amides; and
   nano phosphors, including quantum dots of cadmium selenide and indium phosphide.

5. The light-emitting device according to claim 1, wherein said polymeric carrier material has a glass transition temperature of 60° C. or above.

6. The light-emitting device according to claim 1, wherein said polymeric carrier material has a glass transition temperature of 100° C.

7. The light-emitting device according to claim 1, wherein said polymeric carrier material comprises a second wavelength converting material adapted to convert light of a first and/or a second wavelength to light of a third wavelength.

8. The light-emitting device according to claim 7, wherein the second wavelength converting material at least includes:
   Ca$_{1-x}$AlSiN$_3$:Eu$_x$ (ECAS), where 0<x≤1; and
   Ba$_{2-x-z}$M$_x$Si$_{5-y}$Al$_y$N$_{8-y}$O$_y$:Eu$_z$ (BSSN), where M is Sr or Ca; 0≤x≤1; 0≤y≤4; and 0.0005≤z≤0.05.

9. The light-emitting device according to claim 1, wherein said light source and said wavelength converting element are arranged mutually spaced apart in a remote configuration and wherein the content of said first wavelength converting material in the wavelength converting member is 1% or less by weight.

10. The light-emitting device according to claim 1, wherein the wavelength converting element encloses the solid state light source and is separated from the solid state light source by the atmosphere.

11. A light-emitting device comprising:
   a solid state light source adapted to emit light of a first wavelength, and
   a wavelength converting element, arranged to receive light of said first wavelength and adapted to convert at least part of the light of said first wavelength to light of a second wavelength, said wavelength converting element comprising a polymeric carrier material transparent to light of said first and second wavelengths, said polymeric carrier material comprising a first organic wavelength converting material that is a perylene derivate and is adapted to convert light of the first wavelength to light of the second wavelength,
   wherein an oxygen diffusion coefficient (D) of said polymeric carrier material is $8\times10^{-13}$ cm$^2$/s or less at 25° C.,
   wherein said first organic wavelength converting material is embedded in said polymeric carrier material comprising a semi-crystalline polymeric material comprising polyethylene terephthalate (PET) and/or a copolymer thereof, polyethylene naphthalate (PEN) and/or a copolymer thereof, polyacrylonitril, polyvinylidene chloride, cellulose, or ethylenevinylalcohol, wherein said first organic wavelength converting material comprises one or more dyes, consisting of difluoro-boraindacene derivatives (BODIPY); xanthene dyes, pyrromethane-BF2 complexes, stilbene derivatives, rhodamine dyes, and luminescent polymers including polyphenylene vinylene (PPV) and polyphenyl derivatives dye, wherein said polymeric carrier material is in contact with said first organic wavelength converting material, and wherein said wavelength converting element is enclosed in a space and exposed to an atmosphere within the space having an oxygen concentration of 0.6% or less.

12. A light-emitting device, comprising:
a solid state light source adapted to emit light of a first wavelength; and
a wavelength converting element comprising:
  a polymeric carrier material; and
  a first organic wavelength converting material dispersed in the polymeric carrier material, wherein the first organic wavelength converting material is adapted to convert at least part of the light of the first wavelength to light of a second wavelength,
  wherein the first organic wavelength converting material comprises one or more dyes, consisting of difluoro-boraindacene derivatives (BODIPY); xanthene dyes, pyrromethane-BF2 complexes, stilbene derivatives, rhodamine dyes, and luminescent polymers including polyphenylene vinylene (PPV) and polyphenyl derivatives dye;
  wherein the polymeric carrier material is semi-crystalline and optically transparent with respect to the light of the first and second wavelengths, and
wherein the polymeric carrier material permits diffusion by atmospheric oxygen and an oxygen diffusion rate of the polymeric carrier material, at a temperature of 25° C., is less than or equal to $8 \times 10^{-13}$ cm$^2$/s, and wherein said wavelength converting element is enclosed in a space and exposed to an atmosphere within the space having an oxygen concentration of 0.6% or less.

13. The light-emitting device of claim 12, wherein said polymeric carrier material comprises at least one of polyethylene terephthalate (PET), a copolymer of the PET, polyethylene naphtha late (PEN), and a copolymer of the PEN.

14. The light-emitting device of claim 12, wherein the polymeric carrier material is in the form of a film having a thickness ranging from 30 micrometers to 2 millimeters.

15. The light-emitting device according to claim 12, wherein the first organic wavelength converting material further comprises:
  a perylene derivate, including perylene bis and mono amides; and
  nano phosphors, including quantum dots of cadmium selenide and indium phosphide.

16. The light-emitting device according to claim 12, wherein the polymeric carrier material has a glass transition temperature of 60° C. or above.

17. The light-emitting device according to claim 12, wherein the first wavelength converting material contained in the wavelength converting element is less than or equal to 1% by weight.

18. The light-emitting device according to claim 12, wherein the wavelength converting element comprises a second wavelength converting material, the second wavelength converting material being adapted to convert the light of the first wavelength to light of a third wavelength.

19. The light-emitting device of claim 18, wherein the second wavelength converting material at least includes:
  $Ca_{1-x}AlSiN_3$:Eux (ECAS), where 0<x≤1; and
  $Ba_{2-x-z}M_xSi_{5-y}Al_yN_{8-y}O_y$:Euz (BSSN), where M is Sr or Ca; 0≤x≤1; 0≤y≤4; and 0.0005≤z≤0.05.

20. The light-emitting device according to claim 12, wherein the first organic wavelength converting material is molecularly dissolved in the polymeric carrier material.

* * * * *